(Model.)
W. H. SMITH.
CROSS CUT SAWING MACHINE.
No. 252,333.    Patented Jan. 17, 1882.
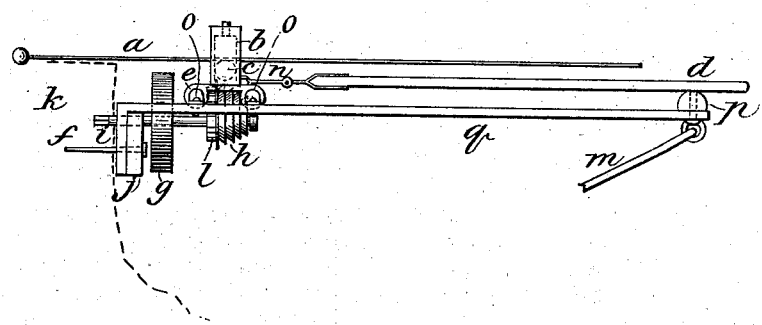
Fig. 2.
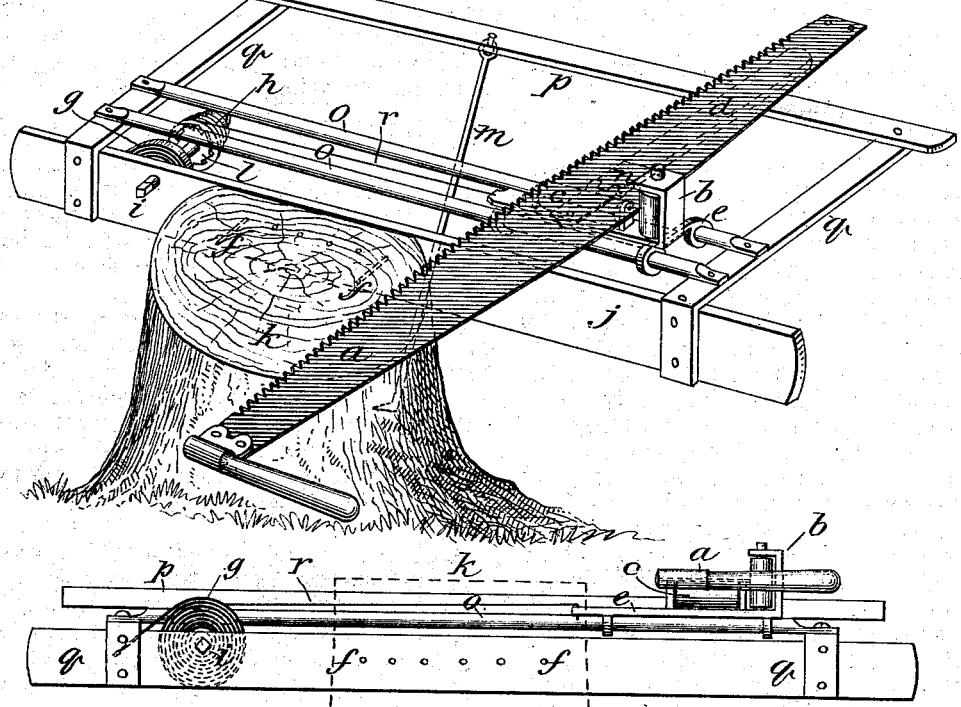
Fig. 1.
Fig. 3.
Witnesses:
J. R. N. Sellwood
John W. Sellwood
Inventor.
W. H. Smith

UNITED STATES PATENT OFFICE.

WILLIAM H. SMITH, OF PORTLAND, OREGON.

CROSSCUT-SAWING MACHINE.

SPECIFICATION forming part of Letters Patent No. 252,333, dated January 17, 1882.

Application filed November 11, 1880. (Model.)

*To all whom it may concern:*

Be it known that I, WILLIAM HAMPTON SMITH, of Portland, in the county of Multnomah, in the State of Oregon, have invented an Improved Sawing-Machine for Felling Trees, of which the following is a specification.

My invention relates to a common crosscut-sawing machine for felling trees, the nature of which is shown in the drawings.

Figure 1 shows a perspective view of the whole applied to a tree or stump. Fig. 2 is an end view, and Fig. 3 a side view, of the same.

The whole will be better understood from a reference to Fig. 1, where $a$ is a saw; $b$, a steel roller, against which the back of the saw runs; and $c$, also a roller of steel, both being placed on a carriage, $e$. The carriage $e$, moving freely on two rods, $o$ $o$, carries the saw and bearing-board $d$. This bearing-board $d$ is hinged at $n$ for purposes of convenience and repair, because this board is worn out by the teeth of the saw and has to be replaced frequently. It is made longer or shorter to match the length of the saw used. The saw, rollers, board, &c., on the frame or carriage $e$ are drawn toward the tree by means of the cord $r$, which is attached to a cone-pulley, $h$, on a shaft, $i$, having a spring, $g$, ratchet $l$, and pawl $l'$. This spring, operating through the cord $r$, draws the saw against the wood of the tree to be sawed. This spring is an ordinary clock-spring, not very large, such a one being sufficiently strong for all practical purposes. The ratchet is only used for increasing the strength of the tension of the cord when the force of the spring is nearly spent—*i. e.*, when the saw has nearly cut through the tree—and in order to increase the draft against the wood the spring is wound up a turn or two, sometimes, in a large tree, the same not being necessary in a small tree.

The wooden bar $p$ supports the bearing-board $d$ as the same slides along from end to end of $p$.

On the under side of $p$, and about its middle, is placed a loose-jointed iron hook or dog, $m$, which is driven into the stump in such a way as to form a brace and support for $p$, holding it in proper position. The stump is flattened on one side, and the board $j$, carrying the flattened iron bars $q\,q$, which are attached to the ends of $p$ and $j$, is nailed onto it by some wrought iron nails, $f\,f$, which are easily withdrawn by giving either end of $j$ a quick pull when the tree starts to fall, and in this way is usually thrown off from the tree far enough to be uninjured by it. There is a small piece of strap-iron perforated with six or eight nail-holes, so that the nails shall not wear the board out, on the side of $j$ away from the tree. (Not shown in the drawings.)

This sawing-machine is used in the same way that a man would stand to chop—sometimes on a chopping-board many feet above the ground; and the whole of it, as constructed for use, weighs about nine pounds, exclusive of the saw, being thus easily carried from place to place, and is capable of doing the work of three or four ordinary choppers with axes.

I claim—

A sawing-machine for felling trees, consisting of a crosscut-saw, a frame, $j\,q\,q\,p$, having guide-rods $o\,o$, and feed-carrier $c$, operated by a spring, $g$, and cord $r$, said feed-carrier having rollers $b$ and $c$, and a hinged bearing-board $d$, when made substantially as described, and for the purpose set forth.

WILLIAM HAMPTON SMITH.

Witnesses:
 CHAS. B. TALBOT,
 A. C. TALBOT.